United States Patent
Lee et al.

(10) Patent No.: US 12,548,278 B2
(45) Date of Patent: Feb. 10, 2026

(54) PREPROCESSING METHOD AND ELECTRONIC DEVICE FOR RADAR POINT CLOUD

(71) Applicant: Quanta Computer Inc., Taoyuan (TW)

(72) Inventors: Chi-Hsuan Lee, Taoyuan (TW); Tsung-Ying Hsieh, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 379 days.

(21) Appl. No.: 17/929,914

(22) Filed: Sep. 6, 2022

(65) Prior Publication Data

US 2023/0368485 A1    Nov. 16, 2023

(30) Foreign Application Priority Data

May 13, 2022    (TW) ................... 111118026

(51) Int. Cl.
*G06V 10/22*    (2022.01)
*G06T 7/70*    (2017.01)
*G06V 10/762*    (2022.01)

(52) U.S. Cl.
CPC ............... *G06V 10/22* (2022.01); *G06T 7/70* (2017.01); *G06V 10/762* (2022.01); *G06T 2207/10028* (2013.01); *G06T 2207/10044* (2013.01)

(58) Field of Classification Search
CPC .. G06V 10/22; G06V 10/762; G06V 2201/12; G06V 10/30; G06V 10/763; G06V 10/764; G06V 20/64; G06V 10/82; G06V 10/454; G06T 7/70; G06T 2207/10028; G06T 2207/10044; G06T 5/70; G06T 2207/20081; G06T 2207/20084; G06T 7/50; G06T 7/55; G06T 19/20; G06T 17/00; G06T 2200/04; G06T 2207/20024; (Continued)

(56) References Cited

U.S. PATENT DOCUMENTS

2015/0003723 A1*  1/2015  Huang ................. G06V 20/653
                                                                382/154
2019/0310378 A1* 10/2019  Ho .......................... G01S 17/89
(Continued)

FOREIGN PATENT DOCUMENTS

CN      109993192 A  *  7/2019  ............. G06F 18/23
CN      111192284 A  *  5/2020  ............. G06K 9/622
(Continued)

*Primary Examiner* — Henok Shiferaw
*Assistant Examiner* — Woo C Rhim
(74) *Attorney, Agent, or Firm* — McClure, Qualey & Rodack, LLP

(57) ABSTRACT

A preprocessing method for a radar point cloud for object recognition is provided. A plurality of points from a radar are received. Each point indicates the reception intensity of the signal reflected from the object received by the radar. The points are filtered according to the reception intensity to obtain a plurality of first preprocessing points. A cluster analysis algorithm is executed on the first preprocessing points to identify a plurality of target points corresponding to the object in the first preprocessing points. The target points are filtered according to the reception intensity to obtain a plurality of second preprocessing points. The second preprocessing points are input into an artificial intelligence model to perform object recognition.

10 Claims, 3 Drawing Sheets

(58) Field of Classification Search
CPC ........ G01S 7/292; G01S 7/354; G01S 7/2922;
G01S 7/411; G01S 13/325; G01S 13/34;
G01S 7/417; G01S 7/4802; G06F 18/23;
G06F 16/55
See application file for complete search history.

(56) References Cited

U.S. PATENT DOCUMENTS

| | | | |
|---|---|---|---|
| 2021/0117659 A1* | 4/2021 | Foroozan | G06V 10/25 |
| 2021/0156963 A1* | 5/2021 | Popov | G06N 3/045 |
| 2021/0192841 A1* | 6/2021 | Hu | G01S 13/867 |
| 2022/0196798 A1* | 6/2022 | Chen | G01S 13/89 |
| 2022/0291390 A1* | 9/2022 | Ryu | G01S 17/86 |
| 2023/0067322 A1* | 3/2023 | Ding | G01S 13/726 |
| 2023/0126749 A1* | 4/2023 | Ali | G01S 13/89 |
| | | | 342/61 |
| 2023/0136937 A1* | 5/2023 | Cheng | A63B 24/0062 |
| | | | 342/194 |
| 2023/0139751 A1* | 5/2023 | Sanderovich | G01S 13/89 |
| | | | 382/103 |
| 2023/0154313 A1* | 5/2023 | Wilmes | G01S 17/931 |
| | | | 701/117 |
| 2023/0161014 A1* | 5/2023 | Pan | G06T 7/73 |
| | | | 382/103 |
| 2023/0162371 A1* | 5/2023 | Shibata | G06T 7/74 |
| | | | 382/180 |
| 2023/0184946 A1* | 6/2023 | Yoo | G01S 17/58 |
| | | | 356/28 |
| 2023/0196728 A1* | 6/2023 | Flores Tapia | G06F 18/2321 |
| | | | 382/103 |
| 2023/0213646 A1* | 7/2023 | John Wilson | G06V 10/25 |
| | | | 342/179 |
| 2023/0243970 A1* | 8/2023 | Lee | G01S 17/66 |
| | | | 356/4.01 |
| 2023/0258813 A1* | 8/2023 | Jeong | G01S 17/89 |
| | | | 701/301 |
| 2023/0296758 A1* | 9/2023 | Akbarzadeh | G01S 13/867 |
| | | | 382/103 |
| 2024/0151855 A1* | 5/2024 | Chattopadhyay | G01S 17/89 |
| 2024/0221180 A1* | 7/2024 | Siak | G06V 10/25 |

FOREIGN PATENT DOCUMENTS

| | | | | |
|---|---|---|---|---|
| CN | 111783648 A | * | 10/2020 | |
| CN | 113516052 A | * | 10/2021 | |
| CN | 113537316 A | * | 10/2021 | ........ G06F 18/2321 |
| CN | 114199168 A | * | 3/2022 | |
| CN | 114200477 A | * | 3/2022 | |
| CN | 114218978 A | * | 3/2022 | |
| CN | 114359876 A | * | 4/2022 | |
| CN | 114398996 A | * | 4/2022 | |
| CN | 111461023 B | * | 4/2023 | ........ G06K 9/00664 |
| CN | 111580131 B | * | 7/2023 | ........ G01S 17/931 |
| CN | 117011388 A | * | 11/2023 | |
| KR | 102343048 B1 | * | 12/2021 | |
| KR | 20220055707 A | * | 5/2022 | |
| WO | WO-2022061850 A1 | * | 3/2022 | |
| WO | WO-2022198637 A1 | * | 9/2022 | |

* cited by examiner

PREPROCESSING METHOD AND ELECTRONIC DEVICE FOR RADAR POINT CLOUD

CROSS REFERENCE TO RELATED APPLICATIONS

This application claims the benefit of Taiwan Application No. 111118026, filed on May 13, 2022, the entirety of which is incorporated by reference herein.

BACKGROUND OF THE INVENTION

Field of the Invention

The present invention relates to a preprocessing method, and, in particular, to a preprocessing method and an electronic device for a millimeter-wave radar point cloud.

Description of the Related Art 3D point clouds are becoming more and more popular in many fields, such as object recognition and object reconstruction. The rapid development of 3D sensors such as radar, time-of-flight cameras, and lidar has made it easy to obtain point cloud data. However, due to the limitations of these sensors and the inherent noise of the acquisition equipment, when the sensors are used to acquire point clouds, it is inevitable that they suffer from noise interference.

In the prior art, many algorithms have been proposed to filter noise in point clouds, such as the Iteratively Least Square approach, neighborhood-based filtering, and growing neural gas networks. However, these algorithms are specially designed for lidar or time-of-flight cameras, not for millimeter-wave radar, and the above-mentioned algorithms are complex, so that powerful computing power is required. How to design a simple noise removal algorithm that can be dedicated to millimeter-wave radar has become an important topic.

BRIEF SUMMARY OF THE INVENTION

An embodiment of the present invention provides a preprocessing method for a radar point cloud for object recognition. A plurality of points from a radar are received. Each point indicates the reception intensity of the signal reflected from the object received by the radar. The points are filtered according to the reception intensity to obtain a plurality of first preprocessing points. A cluster analysis algorithm is executed on the first preprocessing points to identify a plurality of target points corresponding to the object in the first preprocessing points. The target points are filtered according to the reception intensity to obtain a plurality of second preprocessing points. The second preprocessing points are input into an artificial intelligence model to perform object recognition.

According to the preprocessing method described above, there are more first preprocessing points than target points, and there are more target points than second preprocessing points.

According to the preprocessing method described above, the step of filtering the points according to the reception intensity to obtain the first preprocessing points includes selecting the top N1 points with the strongest reception intensity among the points as the first preprocessing points. N1 is a positive integer.

According to the preprocessing method described above, the step of filtering the target points according to the reception intensity to obtain the second preprocessing points includes selecting the top N2 points with the strongest reception intensity among the target points as the second preprocessing points. N2 is a positive integer. N1 is larger than N2.

According to the preprocessing method described above, the step of executing the cluster analysis algorithm on the first preprocessing points to identify the target points corresponding to the object in the first preprocessing points includes regarding one of the first preprocessing points and its neighboring points as being in the same cluster in three-dimensional space when the distance between this first preprocessing point and its neighboring points is within a preset distance. The method also includes regarding all points in the cluster in three-dimensional space as target points corresponding to the object when the number of all points included in the cluster (including the aforementioned first preprocessing point) is greater than a preset number.

According to the preprocessing method described above, the points are generated by the radar in one or more frames.

The present invention also provides an electronic device to preprocess a radar point cloud for object recognition. The electronic device includes a least one radar and at least one processor. The radar is configured to transmit an RF signal to an object, receive a reflected signal from the object, and generate a plurality of points according to the reflected signal. The processor is configured to receive a plurality of points from the radar. Each point indicates the reception intensity of the reflected signal reflected from the object received by the radar. The processor is configured to filter the points according to the reception intensity to obtain a plurality of first preprocessing points, execute a cluster analysis algorithm on the first preprocessing points to identify a plurality of target points corresponding to the object in the first preprocessing points, filter the target points according to the reception intensity to obtain a plurality of second preprocessing points; and input the second preprocessing points into an artificial intelligence model to perform object recognition.

According to the electronic device described above, there are more first preprocessing points than target points, and there are more target points than second preprocessing points.

According to the electronic device described above, the processor selects the top N1 points with the strongest reception intensity among the points as the first preprocessing points. N1 is a positive integer.

According to the electronic device described above, the processor selects the top N2 points with the strongest reception intensity among the target points as the second preprocessing points. N2 is a positive integer, and N1 is larger than N2.

BRIEF DESCRIPTION OF THE DRAWINGS

The present invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the present invention.

DETAILED DESCRIPTION OF THE INVENTION

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means. The following descriptions are preferred ways to implement the present invention. The purpose is to illustrate the spirit of the present invention and not to limit the scope of protection of the present invention.

The following description is the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
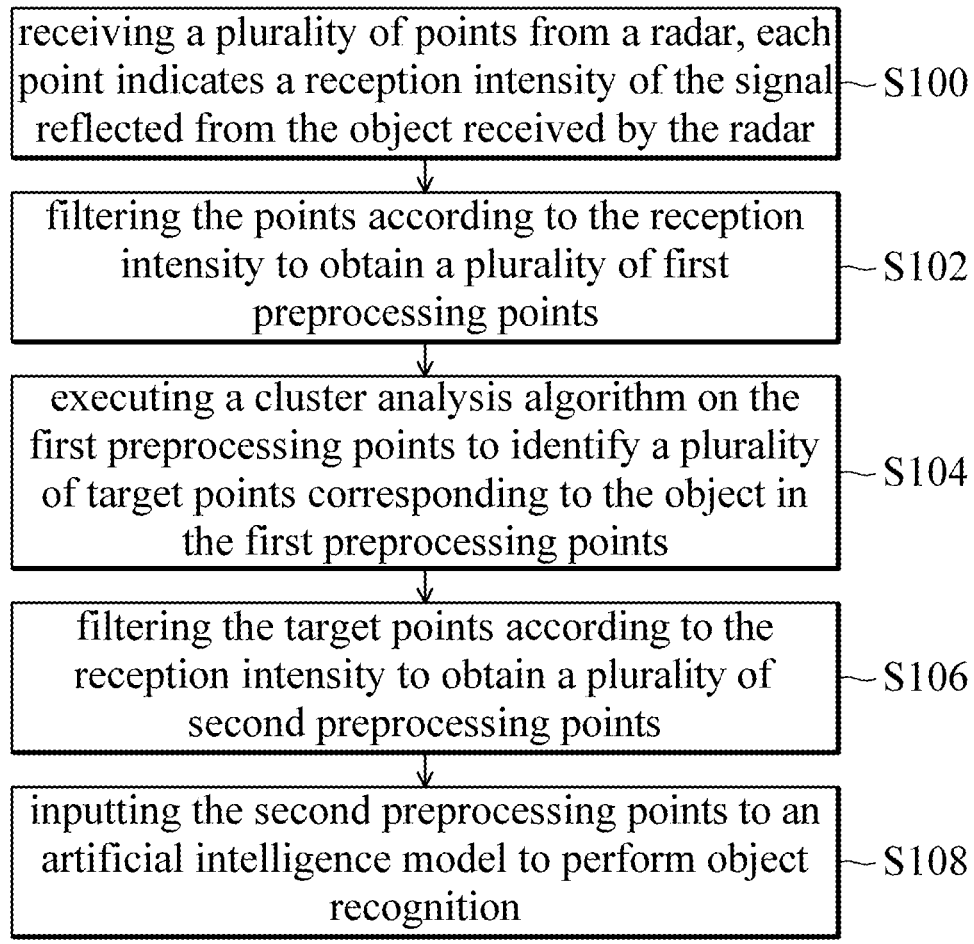
FIG. 1 is a flow chart of a preprocessing method for a radar point cloud in accordance with some embodiments of the present invention.

FIG. 1 is a flow chart of a preprocessing method for a radar point cloud in accordance with some embodiments of the present invention. As shown in FIG. 1, the preprocessing method for a radar point cloud of the present invention includes the following steps. Step S100 involves receiving a plurality of points from a radar. Each point indicates the reception intensity of the signal reflected from the object received by the radar. Step S102 involves filtering the points according to the reception intensity to obtain a plurality of first preprocessing points. Step S104 involves executing a cluster analysis algorithm on the first preprocessing points to identify a plurality of target points that correspond to the object in the first preprocessing points. Step S106 involves filtering the target points according to the reception intensity to obtain a plurality of second preprocessing points. Step S108 involves inputting the second preprocessing points into an artificial intelligence model to perform object recognition.

In step S100, the points from the radar are generated by the radar executing a point generation algorithm. The radar transmits an RF signal to an object, and receives a reflected signal reflected from the object. In some embodiments, the radar converts the reflected signal reflected from the object into a ranging profile. The ranging profile records the distance between each of the receiving antennas and the object and the reception intensity corresponding to the distance. In some embodiments, the radar may include a microprocessor. In addition to converting the reflected signal into the ranging profile, the microprocessor may also generate a voxel profile according to the ranging profile. The voxel profile is used to indicate the relationship between the distance and the reception intensity between the object and each radar in three-dimensional space. For example, the voxel data can be a visualized three-dimensional pixel image, and the type or depth of color is used to mark the magnitude of the reception intensity corresponding to the distance between the target and each radar.

For example, it is assumed that the coordinate point A and the coordinate point B in a voxel map both correspond to different distances between the object and the receiving antenna of the radar. When the visualized color of coordinate point A is red, and the visualized color of point B is light blue, it means that the receiving antenna at the distance corresponding to the coordinate point A obtains a greater reception intensity than at the distance corresponding to the coordinate B. In some embodiments, the microprocessor of the radar executes the point generation algorithm to generate a plurality of points in three-dimensional space according to the voxel profile (or the voxel map) and a preset reception intensity threshold.

In detail, when the difference between the reception intensity of the coordinate point corresponding to the distance and the reception intensity around a coordinate point is less than or equal to the reception intensity threshold, the microprocessor of the radar regards the coordinate point and the area surrounding the coordinate point as having no point in three-dimensional space. When the difference between the reception intensity of the coordinate point corresponding to the distance and the reception intensity around the coordinate point is greater than the reception intensity threshold, the microprocessor of the radar regards the coordinate point and the area surrounding the coordinate point as the same point in three-dimensional space. Therefore, each point in the three-dimensional space may provide a sufficient indication of the reception intensity of the reflected signal received by the radar. In some embodiments, the point generation algorithm may be an ordered statistic CFAR (OS-CFAR) algorithm, but the present invention is not limited thereto.

For example, assume that there is a coordinate point C in three-dimensional space of the voxel profile, and the corresponding reception intensity value is 40. In the same three-dimensional space, there is a coordinate point D adjacent to the coordinate point C, and the corresponding reception intensity value is 25. Therefore, when the reception intensity threshold is set to 10, since the reception intensity threshold is less than or equal to the difference between the coordinate point C and the coordinate point D corresponding to the reception intensity (for example, the difference is 15), the microprocessor of the radar may regard the coordinate point C and the coordinate point D as the same point in three-dimensional space. When the reception intensity threshold is 20, since the reception intensity threshold is greater than the difference between the coordinate point C and the coordinate point D (for example, the difference is 15), the microprocessor of the radar may regard the coordinate point C and the coordinate point D as different points in three-dimensional space. In some embodiments, the reception intensity can be represented by a signal-to-noise ratio (SNR), but the present invention is not limited thereto.

In step S100, the points from the radar are generated by the radar in one or more frames. A frame is the period during which the radar transmits an RF signal to an object and receives a reflected signal from the object. In some embodiments, the point cloud data from a signal frame may be incomplete and sometimes more likely to be heavily affected by high-intensity clustered noise. In the aforementioned situation, the point cloud data from multiple frames can effectively increase the accuracy of the point cloud data. That is, the superposition of the point cloud data from multiple frames may increase the reception intensity corresponding to each point from the radar in the three-dimensional space, and the difference between the effective point and the noise point may increase. Therefore, the preprocessing method of the present invention may increase the reception intensity threshold in the aforementioned point generation algorithm, so as to improve the chance of filtering out the noise.

In some embodiments, the radar may be a frequency modulated continuous wave (FMCW) radar, a pulse radar, a pulse Doppler radar, a pulse coherent radar, an orthogonal frequency-division multiplexing (OFDM) radar, or a stepped-frequency continuous wave (SFCW) radar, but the present invention is not limited thereto.

In step S102, the preprocessing method of the present invention selects the top N1 points with the strongest reception intensity among the points as the first preprocessing points in the step S102. N1 is a positive integer. The number of points from the radar may be much greater than N1. In step S102, the preprocessing method of the present invention executes a first intensity filtering on the points from the radar, so as to filter out the noise received by the radar.

In step S104, the preprocessing method of the present invention regards one of the first preprocessing points and its neighboring points as being in the same cluster in three-dimensional space when the distance between the one of the first preprocessing points and its neighboring points is within a preset distance. The preprocessing method of the present invention regards all points in the cluster in three-dimensional space as the target points corresponding to the object when the number of all of the points included in the cluster (including the aforementioned first preprocessing point) is greater than the preset number. In some embodiments, there are more first preprocessing points in step S102 than that target points in step S104. In some embodiments, the cluster analysis algorithm is Density-Based Spatial Clustering of Applications with Noise algorithm, but the present invention is not limited thereto.

For example, assume that there is a point E and a point F in the first preprocessing points from step S102, and the distance between point E and point F in three-dimensional space is 30 (arbitrary length unit). When the preset distance is 50, since the distance between point E and point F is within the preset distance (that is, the distance between point E and point F is less than or equal to the preset distance), the preprocessing method of the present invention regards point E and point F as being in the same cluster. Furthermore, the preprocessing method of the present invention performs clustering judgment and classification on other points in the first preprocessing points from step S102 according to the same rule. In other words, as the number of judged points increases, the cluster including point E and point F may become larger and larger. When the total number of points included in the cluster including point E and point F is greater than the preset number (for example, 100 points) and there is only one target in the indoor space, the preprocessing method of the present invention regards all the points included in the cluster including point E and point F as target points corresponding to the object. The position of the cluster is the position of the object.

In some embodiments, when the preset distance is 20, since the distance between the point E and the point F is outside the preset distance (that is, the distance between the point E and the point F is greater than the preset distance), the preprocessing method of the present invention regards the point E and the point F as being in different clusters. The preprocessing method of the present invention performs clustering judgment and classification on other points in the first preprocessing points from step S102 according to the same rule. In other words, as the number of judged points increases, the range of the first cluster including the point E and the second cluster including the point F may become larger and larger.

In cases with two targets in the indoor space, the preprocessing method of the present invention regards all the points included in the first cluster (including point E) as one of the two targets, and it regards all the points included in the second cluster (including point F) as the other of the two targets. In other words, the position of the first cluster is the position of one of the two targets, and the position of the second cluster is the position of the other target.

After that, in step S106, the preprocessing method of the present invention selects the top N2 points with the strongest reception intensity among the target points as the second preprocessing points. N2 is a positive integer, and the number of target points in step S104 is greater than N2. In step S106, the preprocessing method of the present invention executes a second intensity filtering on the target points obtained in step S104, so as to filter out the remaining noise.

Finally, in step S108, since most artificial intelligence models limit the amount of input data that can be input into it, the preprocessing method of the present invention can correspondingly set a value of N2 according to the amount of input data limited by the artificial intelligence model. In some embodiments, the artificial intelligence model in step S108 can be, for example, an image recognition algorithm or a convolutional neural network (e.g., PointNet), but the present invention is not limited thereto.

Figure 2:
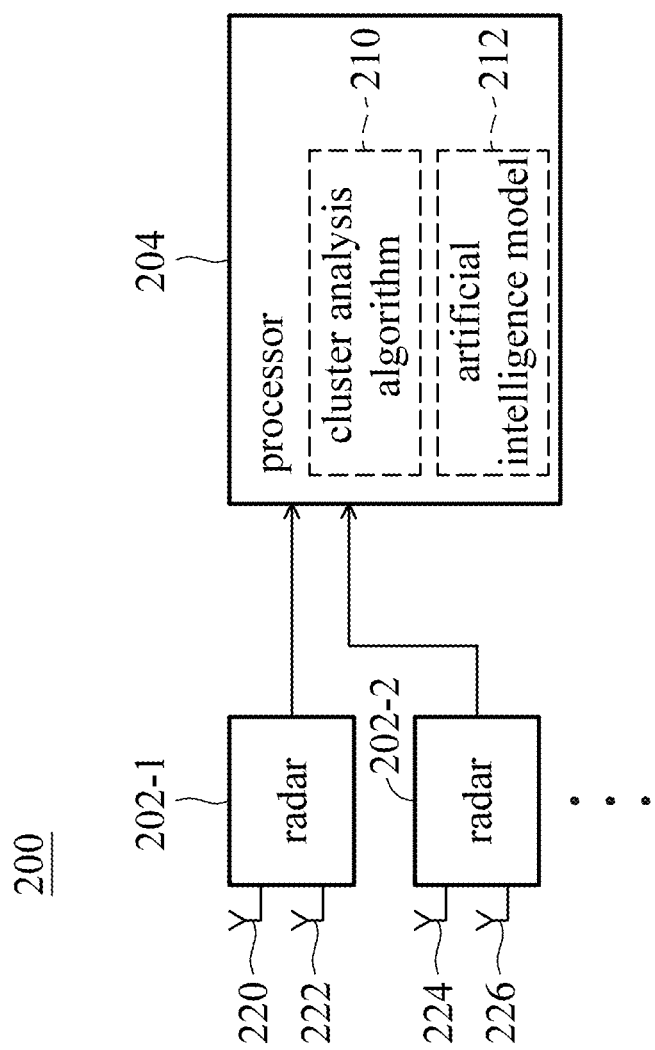
FIG. 2 is a schematic diagram of an electronic device 200 in accordance with some embodiments of the present invention.

FIG. 2 is a schematic diagram of an electronic device 200 in accordance with some embodiments of the present invention. As shown in FIG. 2, the electronic device 200 includes at least one radar (for example, radars 202-1 and 202-2), and at least one processor (for example, a processor 204). In some embodiments, the radar 202-1 includes a transmitting antenna 220 and a receiving antenna 222. The radar 202-2 includes a transmitting antenna 224 and a receiving antenna 226. In some embodiments, the receiving antenna 222 and the receiving antenna 226 are array antennas (not shown) arranged in a two-dimensional structure, but the present invention is not limited thereto. The radar 202-1 transmits an RF signal to an object through the transmitting antenna 220, receives a reflected signal reflected from the object through the receiving antenna 222, and generates a plurality of points according to the reflected signal. Similarly, the radar 202-2 transmits the RF signal to the object through the transmitting antenna 224, receives a reflected signal reflected from the object through the receiving antenna 226, and generates a plurality of points according to the reflected signal.

In some embodiments, the processor 204 receives the points from radars 202-1 and 202-2, and each point indicates the reception intensity of the signal reflected from the object received by radars 202-1 and 202-2 (step S100 in FIG. 1). The processor 204 filters the points according to the reception intensity to obtain a plurality of first preprocessing points (step S102 in FIG. 1). The processor 204 executes a cluster analysis algorithm on the first preprocessing points to identify a plurality of target points corresponding to the object in the first preprocessing points (step S104 in FIG. 1). The processor 204 filters the target points according to the reception intensity to obtain a plurality of second preprocessing points (step S106 in FIG. 1). Finally, the processor 204 inputs the second preprocessing points into an artificial intelligence model 212 to perform object recognition (step S108 in FIG. 1).

Figure 3:
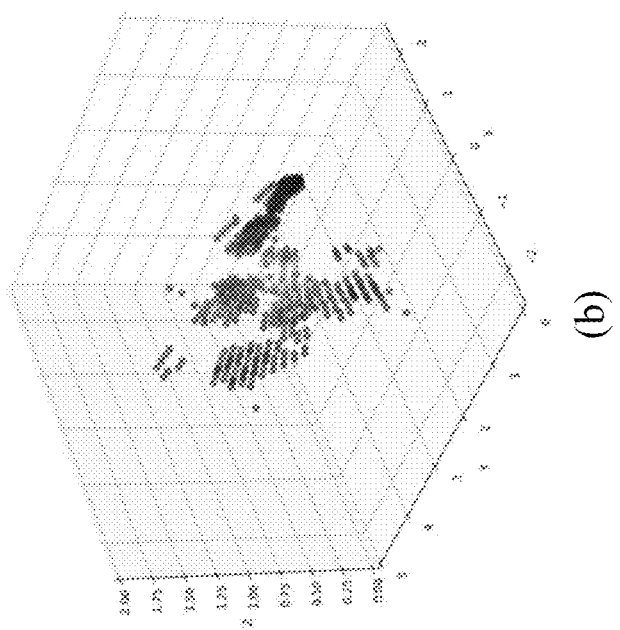
FIG. 3 is a comparison diagram of radar point cloud before and after preprocessing in accordance with some embodiments of the present invention.
Figure 3:
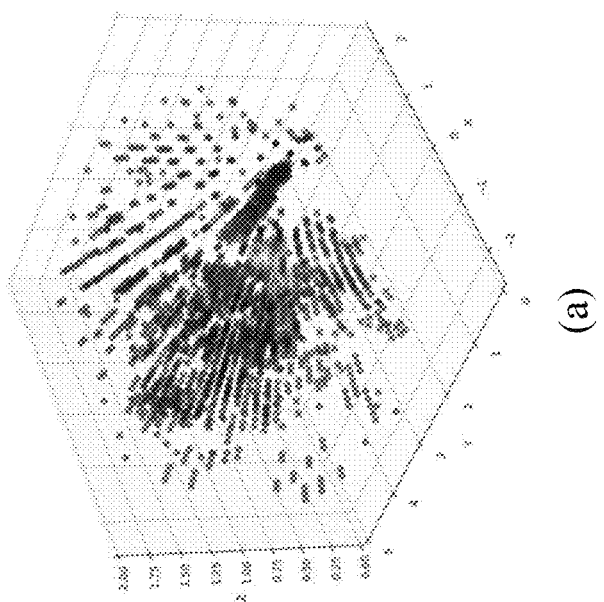

FIG. 3 is a comparison diagram of radar point cloud before and after preprocessing in accordance with some embodiments of the present invention. As shown in FIG. 3, the point cloud (a) from the radar is obtained by step S100 in FIG. 1 of the preprocessing method of the present invention. After that, the preprocessing method of the present invention performs step S102, step S104, and step S106 in FIG. 1 on the point cloud (a), and then the point cloud (b) can be obtained. It can be clearly found that most of the noise has been filtered out by the preprocessing method of the present invention by comparing the point cloud (a) and the point cloud (b). Steps S102 and S106 of the preprocessing method of the present invention are used to filter out low-intensity clustered noise. On the other hand, step S104 of the preprocessing method of the present invention is used to filter out high-intensity clustered noise. After that, the preprocessing method of the present invention inputs the point cloud (b) in FIG. 3 into an artificial intelligence model for performing object recognition.

In the several embodiments provided by the present invention, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of a software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A preprocessing method for a radar point cloud for object recognition, comprising:
   receiving a plurality of points from a radar; wherein each point indicates a reception intensity of a signal reflected from an object received by the radar;
   filtering the points according to the reception intensity to obtain a plurality of first preprocessing points;
   executing a cluster analysis algorithm on the first preprocessing points to identify a plurality of target points corresponding to the object in the first preprocessing points;
   filtering the target points according to the reception intensity to obtain a plurality of second preprocessing points; and
   inputting the second preprocessing points into an artificial intelligence model to perform object recognition;
   wherein the step of receiving the points from the radar comprises:
   converting the signal reflected from the object into a ranging profile; wherein the ranging profile records a distance between each of receiving antennas and the object, and the reception intensity corresponding to the distance;
   generating a voxel profile according to the ranging profile; wherein the voxel profile indicates a relationship between the distance and the reception intensity between the object and the radar in three-dimensional space;
   executing a point generation algorithm to generate the points in the three-dimensional space according to the voxel profile and a preset reception intensity threshold.

2. The preprocessing method as claimed in claim 1, wherein a number of first preprocessing points is more than a number of the target points, and the number of target points is more than a number of the second preprocessing points.

3. The preprocessing method as claimed in claim 1, wherein the step of filtering the points according to the reception intensity to obtain the first preprocessing points comprises:
   selecting top N1 points with the strongest reception intensity among the points as the first preprocessing points;
   wherein N1 is a positive integer.

4. The preprocessing method as claimed in claim 3, wherein the step of filtering the target points according to the reception intensity to obtain the second preprocessing points comprises:
   selecting top N2 points with the strongest reception intensity among the target points as the second preprocessing points;
   wherein N2 is a positive integer, and N1 is larger than N2.

5. The preprocessing method as claimed in claim 1, wherein the step of executing the cluster analysis algorithm on the first preprocessing points to identify the target points corresponding to the object in the first preprocessing points further comprises:
   regarding one of the first preprocessing points and its neighboring points as being in a same cluster in three-dimensional space when a distance between the one of the first preprocessing points and its neighboring points is within a preset distance; and
   regarding all points in a cluster in three-dimensional space as the target points corresponding to the object when a number of all points included in the cluster including the one of the first preprocessing points is greater than a preset number.

6. An electronic device to preprocess a radar point cloud for object recognition, comprising:
   at least one radar, configured to transmit an RF signal to an object, receive a reflected signal from the object, and generate a plurality of points according to the reflected signal;

at least one processor, configured to execute the following steps:

receiving a plurality of points from the at least one radar; wherein each point indicates the reception intensity of the reflected signal reflected from the object received by the at least one radar;

filtering the points according to the reception intensity to obtain a plurality of first preprocessing points;

executing a cluster analysis algorithm on the first preprocessing points to identify a plurality of target points corresponding to the object in the first preprocessing points;

filtering the target points according to the reception intensity to obtain a plurality of second preprocessing points; and inputting the second preprocessing points into an artificial intelligence model to perform object recognition;

wherein the step of receiving the points from the radar comprises:

converting the signal reflected from the object into a ranging profile; wherein the ranging profile records a distance between each of receiving antennas and the object, and the reception intensity corresponding to the distance;

generating a voxel profile according to the ranging profile; wherein the voxel profile indicates a relationship between the distance and the reception intensity between the object and the radar in three-dimensional space;

executing a point generation algorithm to generate the points in the three-dimensional space according to the voxel profile and a preset reception intensity threshold.

7. The electronic device as claimed in claim 6, wherein a number of first preprocessing points is greater than a number of the target points, and the number of target points is greater than a number of the second preprocessing points.

8. The electronic device as claimed in claim 7, wherein the at least one processor selects top N1 points with the strongest reception intensity among the points as the first preprocessing points; wherein N1 is a positive integer.

9. The electronic device as claimed in claim 8, wherein the at least one processor selects top N2 points with the strongest reception intensity among the target points as the second preprocessing points; wherein N2 is a positive integer, and N1 is larger than N2.

10. The electronic device as claimed in claim 6, wherein the points are generated by the radar in one or more frames.

* * * * *